(12) United States Patent
Kelvin (10) Patent No.: US 12,172,465 B2
(45) Date of Patent: Dec. 24, 2024

(54) WHEEL HUB AND REMOVABLE BOLT RING ASSEMBLY FOR AIR DISK BRAKING SYSTEM

(71) Applicant: ACR HOLDINGS DELAWARE, LLC, Westport, CT (US)

(72) Inventor: John Arthur Kelvin, China Township, MI (US)

(73) Assignee: ACR HOLDINGS DELAWARE, LLC, Westport, CT (US)

(*) Notice: Subject to any disclaimer, the term of this patent is extended or adjusted under 35 U.S.C. 154(b) by 523 days.

(21) Appl. No.: 17/606,735

(22) PCT Filed: Apr. 27, 2020

(86) PCT No.: PCT/IB2020/053957
§ 371 (c)(1),
(2) Date: Oct. 26, 2021

(87) PCT Pub. No.: WO2020/217233
PCT Pub. Date: Oct. 29, 2020

(65) Prior Publication Data
US 2022/0212496 A1    Jul. 7, 2022

Related U.S. Application Data

(60) Provisional application No. 62/839,266, filed on Apr. 26, 2019.

(51) Int. Cl.
*B60B 27/00* (2006.01)
*F16D 65/12* (2006.01)
*F16D 65/02* (2006.01)

(52) U.S. Cl.
CPC ..... *B60B 27/0052* (2013.01); *B60B 2900/113* (2013.01); *B60B 2900/115* (2013.01);
(Continued)

(58) Field of Classification Search
CPC ... B60B 27/0052; B60B 27/06; F16D 65/123; F16D 2065/1384
See application file for complete search history.

(56) References Cited

U.S. PATENT DOCUMENTS 6,604,613 B2  8/2003  Burgoon
6,988,598 B2  1/2006  Williams
(Continued)

FOREIGN PATENT DOCUMENTS

WO    WO2009129231 A2    10/2009

*Primary Examiner* — Jason R Bellinger (57) ABSTRACT

A wheel hub and removable bolt ring assembly for air disk braking system includes a hub cylinder, a bolt ring, a locking collar, a plurality of L-shaped locking recesses, and a plurality of rotor mounts that are concentrically positioned around a central axis. The plurality of rotor mounts is positioned adjacent to an outboard end of the hub cylinder. The plurality of L-shaped locking recesses radially traverses into the hub cylinder. The bolt ring and the locking collar are positioned in between the outboard end and an inboard end of the hub cylinder. A plurality of locking splines of the bolt ring is removably mounted around the hub cylinder through the plurality of L-shaped locking recesses. A plurality of locking tabs of the locking collar is removably mounted around the hub cylinder through the plurality of L-shaped locking recesses.

8 Claims, 10 Drawing Sheets

(52) U.S. Cl.
CPC ...... *B60B 2900/541* (2013.01); *F16D 65/123* (2013.01); *F16D 2065/1384* (2013.01)

(56) References Cited

U.S. PATENT DOCUMENTS

| | | | |
|---|---|---|---|
| 7,934,777 | B1 | 5/2011 | Yuhas |
| 11,339,840 | B2 * | 5/2022 | Moon ................. B60B 27/0052 |
| 11,345,189 | B2 * | 5/2022 | Davis .................... F16D 65/123 |
| 11,628,684 | B2 * | 4/2023 | Rengasamy ........ B60B 27/0052 |
| | | | 188/218 XL |
| 2006/0012242 | A1 | 1/2006 | Pete |
| 2012/0247883 | A1 | 10/2012 | Root |
| 2016/0258500 | A1 | 9/2016 | Sabeti |
| 2017/0227077 | A1 | 8/2017 | Hammer |
| 2018/0340584 | A1 | 11/2018 | Wittlinger |

* cited by examiner

WHEEL HUB AND REMOVABLE BOLT RING ASSEMBLY FOR AIR DISK BRAKING SYSTEM

The current application is a 371 of international Patent Cooperation Treaty (PCT) application serial number PCT/IB2020/053957 filed on Apr. 27, 2020. The PCT application PCT/IB2020/053957 claims a priority to a U.S. provisional application Ser. No. 62/839,266 filed on Apr. 26, 2019.

FIELD OF THE INVENTION

The present invention relates to hubs and disc rotors on air disc braking systems. More specifically, the present invention is an easily removable bolt ring assembly to replace or repair the disk rotor of the air disc braking system without disassembling the entire hub and rotor assembly.

BACKGROUND OF THE INVENTION

The present invention relates to hubs and disc rotors used on, for example, commercial trucks or trailer axles, and in particular to manufacture of brake hubs and disc rotors. Generally, air disc brakes have been widely adopted in countries, primarily as result of their performance advantages over conventional drum brakes. These high-performance air disk brakes are now being widely adopted in commercial vehicles due to their efficient performance and safety regulations. However, one major problem of the air disk braking system is the time-consuming process of replacing a disc rotor that results in higher labor cost.

Air disc hubs are generally comprised of a tubular piece of cast iron or aluminum inside of which are fixed a set of bearings so that the hub can easily spin on the axle, providing rotational motion for the wheel. One end of the hub is fitted with a large ring containing usually 10 or more bolts onto which the wheel is attached. This is otherwise known as the "outboard" end of the hub. The opposite end is generally fitted with an attachment for a disc rotor. This end is known as the "inboard" end of the hub. Although the three sections (tubular piece, bolt ring, and attachment for a disc rotor) are referred to individually, they are cast as a one-piece hub.

Because the total weight of the hub and disc rotor assembly generally exceeds 150 pounds, it requires bearings inside of the hub to ensure reduced friction during rotation. To maintain the longevity of those bearings, the hub is generally filled with axle oil, and the axle oil is sealed with two sets of seals. All major manufacturers use this same basic design and engineering for air disc hub and rotor assemblies. In all cases, the existing design of the air disc hub and rotor assemblies are inefficient because it requires removal of the entire hub and disc rotor assembly in order to replace the disc rotor, this results in increased maintenance costs, and potential injury when replacing the disc rotor.

Generally, brake technicians charge two hours of labor for replacement of one disc rotor. This is because the process for replacement generally requires a complicated multi-step process that involves:

1. Draining the axle oil from the hub
2. Removing the hub cap
3. Removing the spindle nut assembly
4. Removing the outboard seal
5. Removing the outboard bearing
6. Removing the entire hub assembly
7. Removing disc rotor bolts
8. Removing the disc rotor
9. Cleaning all bearing races and bearings (inboard and outboard)
10. Cleaning all mating surfaces
11. Reinstalling the rotor
12. Reinstalling the disc rotor bolts
13. Reinstalling the hub and rotor assembly
14. Replacing the inboard bearing
15. Replacing the outboard bearing
16. Replacing the outboard seal
17. Precision torque of the spindle nut (i.e., imprecise torque will cause bearing failure)
18. Replacing the hub cap
19. Refilling with axle oil These 19 steps are the minimum steps required for proper replacement of the rotor, during which the brake technicians must lift a hub and rotor assembly weighing approximately 150 pounds.

Therefore, an objective of the present invention is to provide a wheel hub and removable bolt ring assembly for air disk braking system so that the brake technicians do not have to disassemble the entire hub and disc rotor assembly. More specifically, the present invention is able to repair or replace the disk rotor by removing only the bolt ring and other related components of the bolt ring thus lowering maintenance cost. To accomplish this, the present invention first uses a removable bolt ring that mounts to the hub cylinder by use of a tongue and groove system so that it can be seated to the hub cylinder in a bayonet-style. A slide locking collar is inserted into the hub cylinder in a manner that locks the bolt ring in place when the wheel is mounted. When the slide locking collar is removed, the brake technicians can then rotate the bolt ring and slide it off the outboard end of the hub cylinder. This creates a clearance for the disc rotor to be removed by simply removing its bolts and retainer ring and then pulling the disc rotor through outboard end.

DETAILED DESCRIPTION OF THE INVENTION

All illustrations of the drawings are for the purpose of describing selected versions of the present invention and are not intended to limit the scope of the present invention.

Figure 1:
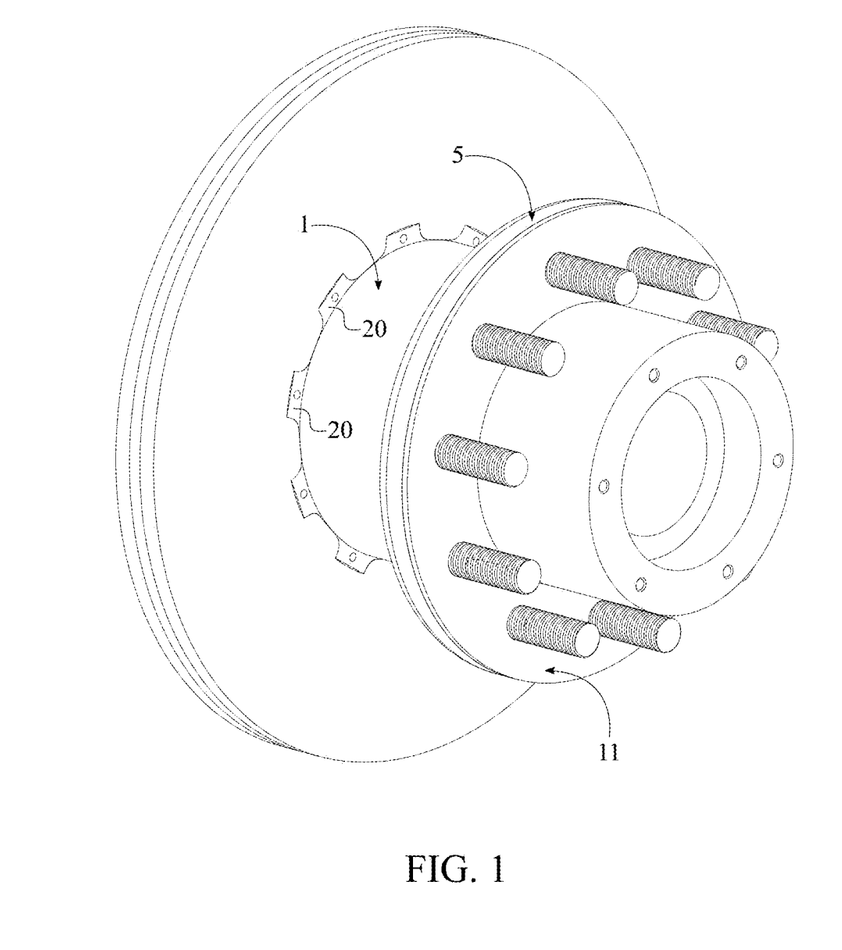
FIG. 1 is a perspective view of the present invention.
Figure 2:
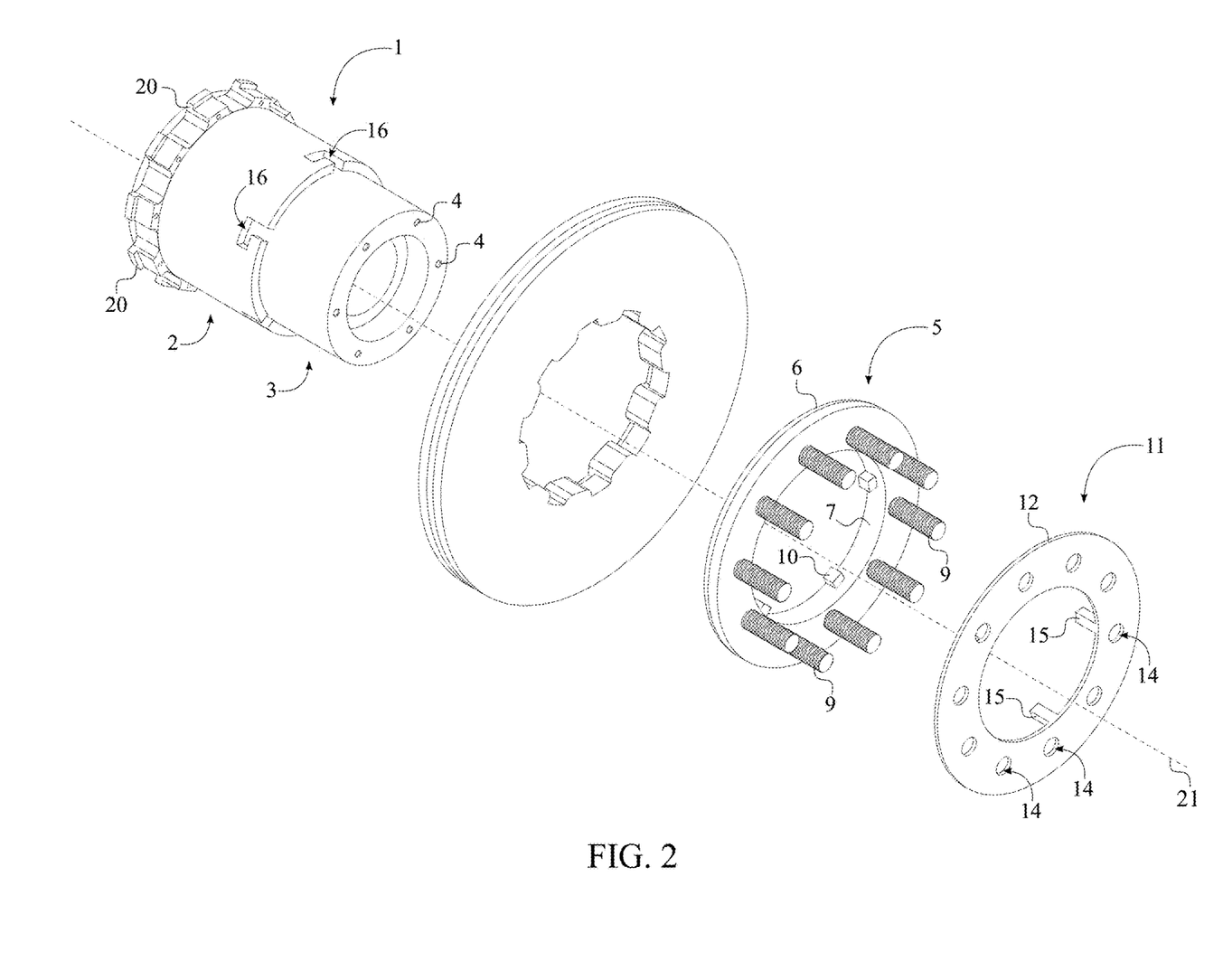
FIG. 2 is an exploded perspective view of the present invention.

The present invention meets an industry need for removal of disk rotor through an outboard side of the hub and rotor assembly in comparison to existing systems that only allow the disk rotor to be removed from an inboard side of the hub and rotor assembly. More specifically, the present invention is a hub and rotor assembly that allows the disc rotor to be replaced or repaired without complete removal of the hub assembly. The resultant effect of the present invention lowers overall maintenance costs and downtime for fleets, while improving the safety aspects of the mechanism shop and the brake technician. The present invention comprises a hub cylinder 1, a bolt ring 5, a locking collar 11, a plurality of L-shaped locking recesses 16, and a plurality of rotor mounts 20 as shown in FIG. 1-2.

In reference to the general configuration of the present invention, the hub cylinder 1, the bolt ring 5, the locking collar 11, the plurality of locking assembly, and the plurality of rotor mounts 20 are concentrically positioned around a central axis 21 thus providing an axial configuration. The plurality of rotor mounts 20 is positioned adjacent to an inboard end 2 of the hub cylinder 1 so that the disk rotor can be radially mounted. The plurality of L-shaped locking recesses 16 radially traverses into the inboard end 2 so that the bolt ring 5 and the locking collar 11 can be removably mounted to the hub cylinder 1 by utilizing a bayonet-style mounting system. The bolt ring 5 that provides a platform to secure a wheel is positioned around the inboard end 2 of the hub cylinder 1. Similarly, the locking collar 11 is positioned the inboard end 2 thus further securing the bolt ring 5 to the hub cylinder 1. In order to provide sufficient clearance for the brake caliper, the bolt ring 5 and the locking collar 11 are positioned offset from the plurality of rotor mounts 20 about the inboard end 2. A plurality of locking splines 10 of the bolt ring 5 is removably mounted around the hub cylinder 1 through the plurality of L-shaped locking recesses 16. More specifically, the plurality of locking splines 10 is inserted and rotated within the plurality of L-shaped locking recesses 16 thus engaging the bolt ring 5 to the hub cylinder 1. A plurality of locking tabs 15 of the locking collar 11 is removably mounted around the hub cylinder 1 through the plurality of L-shaped locking recesses 16. More specifically, the plurality of locking tabs 15 is inserted into the plurality of L-shaped locking recesses 16 thus locking the plurality of locking splines 10 to the plurality of L-shaped locking recesses 16. Once a wheel is mounted to the bolt ring 5 via lug nuts, the wheel and the bolt ring 5 are able to compress the locking collar 11 in place.

The hub cylinder 1 base component of the present invention as the rest of the components are structurally intergraded or mounted to the hub cylinder 1. The hub cylinder 1 is a tubular so that the axle shaft of the vehicle can be concentrically inserted through the hub cylinder 1 and torsionally connected to the hub cylinder 1. As a result, when the axle shaft is rotated, the hub cylinder 1 is also able to rotate with the axle shaft as rotational movement of the axle shaft is transferred to the hub cylinder 1. The inboard end 2 and an outboard end 3 of the hub cylinder 1 delineate two cylindrical portions for the hub cylinder 1, wherein the inner diameter of the hub cylinder 1 preferably remains consistent throughout the inboard end 2 and the outboard end 3. However, the outer diameter of the inboard end 2 is larger than the outer diameter of the outboard end 3 so that each of the plurality of L-shaped locking recesses 16 can comprise an access opening 19 at the mating edge of the inboard end 2 and the outboard end 3.

Figure 3:
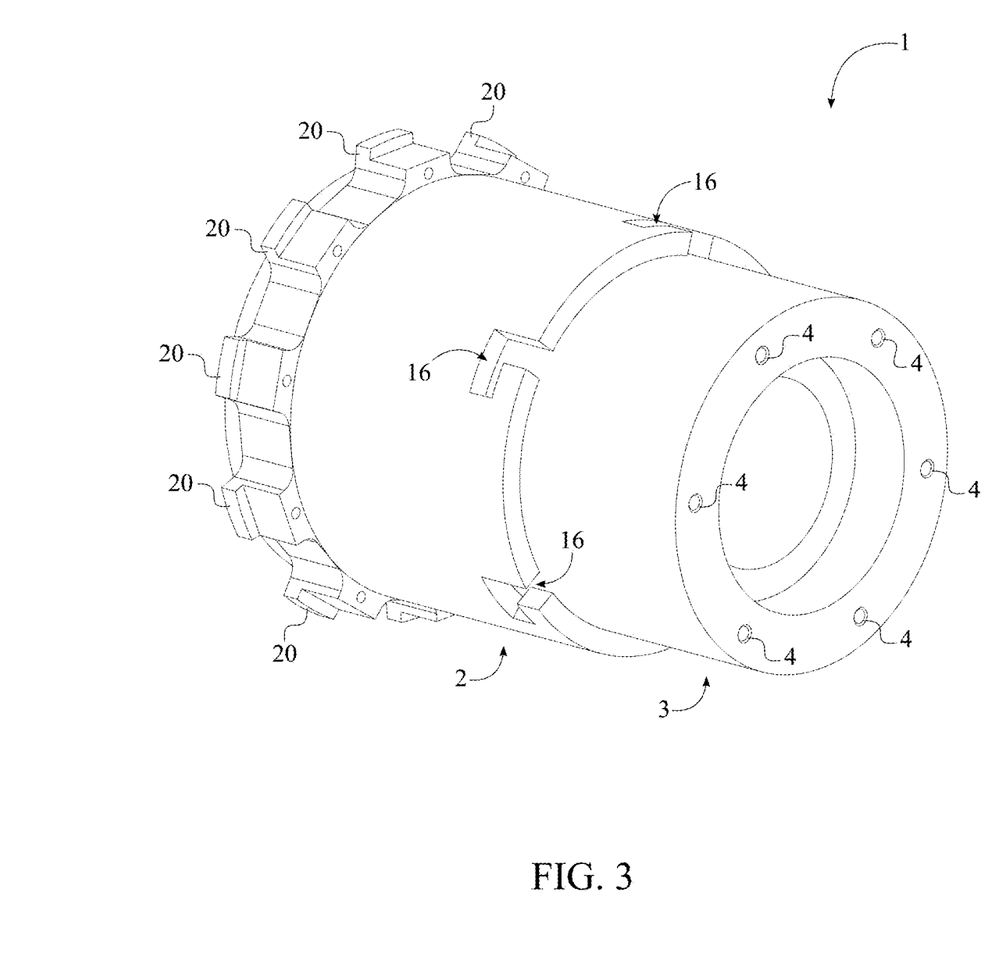
FIG. 3 is a perspective view of the hub cylinder of the present invention.
Figure 4:
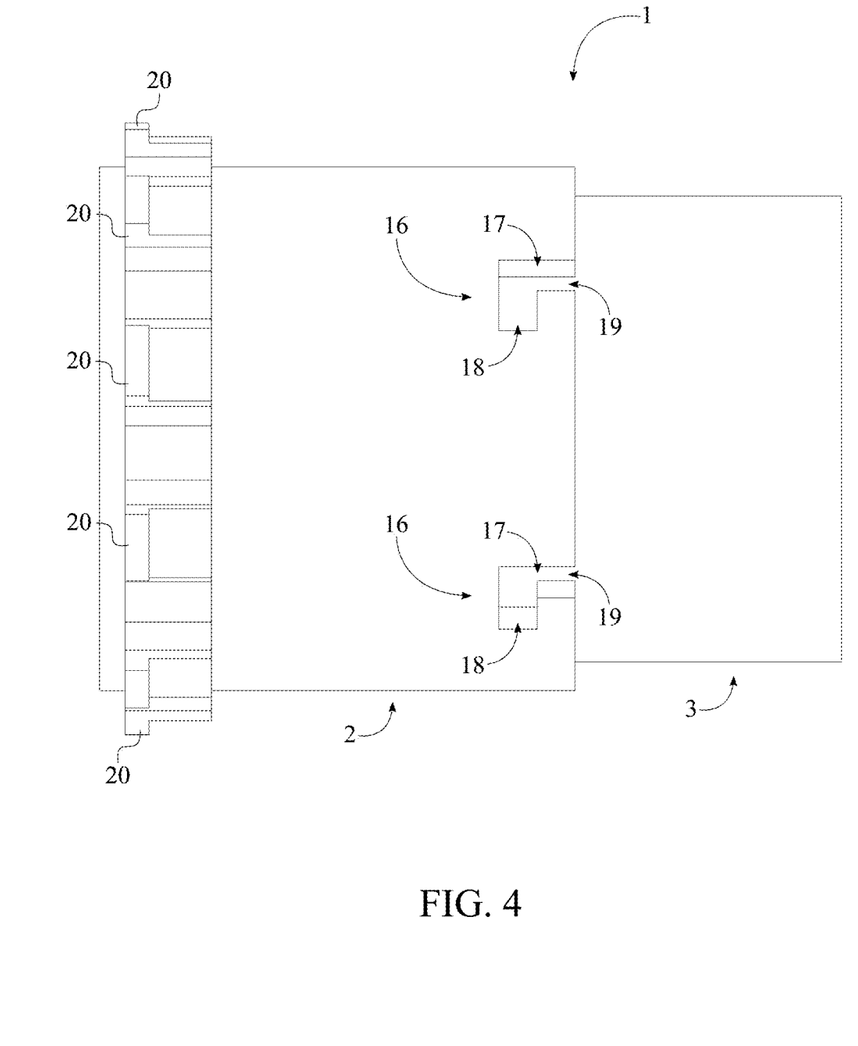
FIG. 4 is a side view of the hub cylinder of the present invention.

In reference to FIG. 3-4, each of the plurality of L-shaped locking recesses 16 comprising an alignment cavity 17 and a locking cavity 18 in addition to the access opening 19. The alignment cavity 17 and the locking cavity 18 are perpendicularly positioned of each other thus delineating the general shape for each of the plurality of L-shaped locking recesses 16. More specifically, the locking cavity 18 is terminally positioned to the alignment cavity 17. The access opening 19 is terminally positioned to the alignment cavity 17. Resultantly, the locking cavity 18 and the access opening 19 are oppositely positioned of each other about the alignment cavity 17 so that the alignment cavity 17 and the locking cavity 18 can be accessed through the access opening 19. Furthermore, the access opening 19 and the alignment cavity 17 are oriented toward the outboard end 3 positioned flush with the mating point of the inboard end 2 and the outboard end 3.

In reference to FIG. 1, the present invention further comprises a plurality of axle attachments 4 that secures the present invention to the axle shaft of the vehicle. More specifically, the plurality of axle attachments 4 is positioned adjacent to the outboard end 3 and radially positioned around the central axis 21. Furthermore, each of the plurality of axle attachments 4 traverses into the hub cylinder 1 so that an axle bolt fastener can be received to secure the axle shaft. In other words, an axle bolt fastener is inserted through the axle shaft to each of the plurality of axle attachments so that the axle shaft and the hub cylinder 1 can be tightened together. Since the disk rotor slides along the hub cylinder 1 and can be removed through the outboard end 3, the hub cylinder 1 does not require to be removed from the axle shaft during disk rotor replacement or repair.

Figure 5:
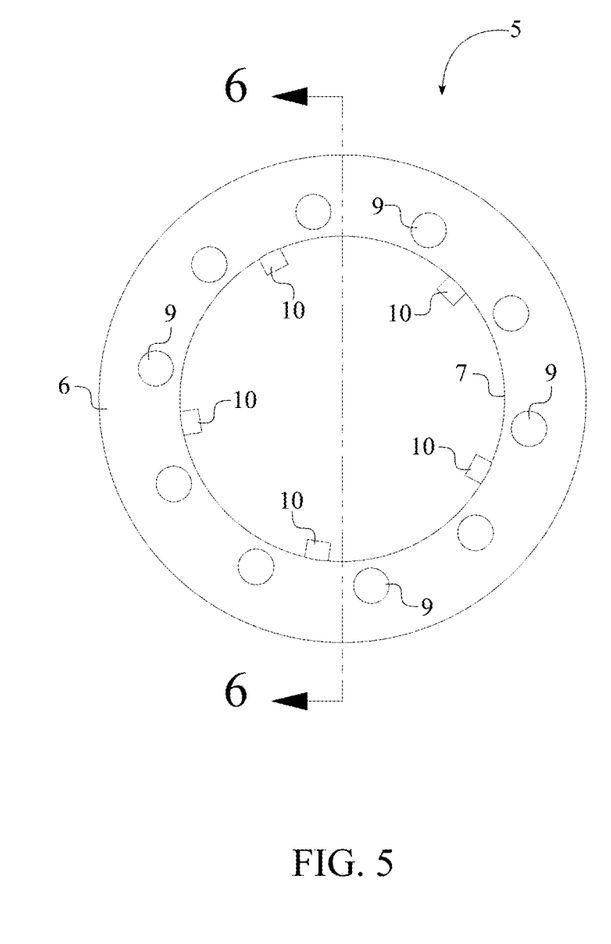
FIG. 5 is a side view for the bolt ring of the present invention, showing the plane upon which a cross sectional view is taken shown in FIG. 6.
Figure 6:
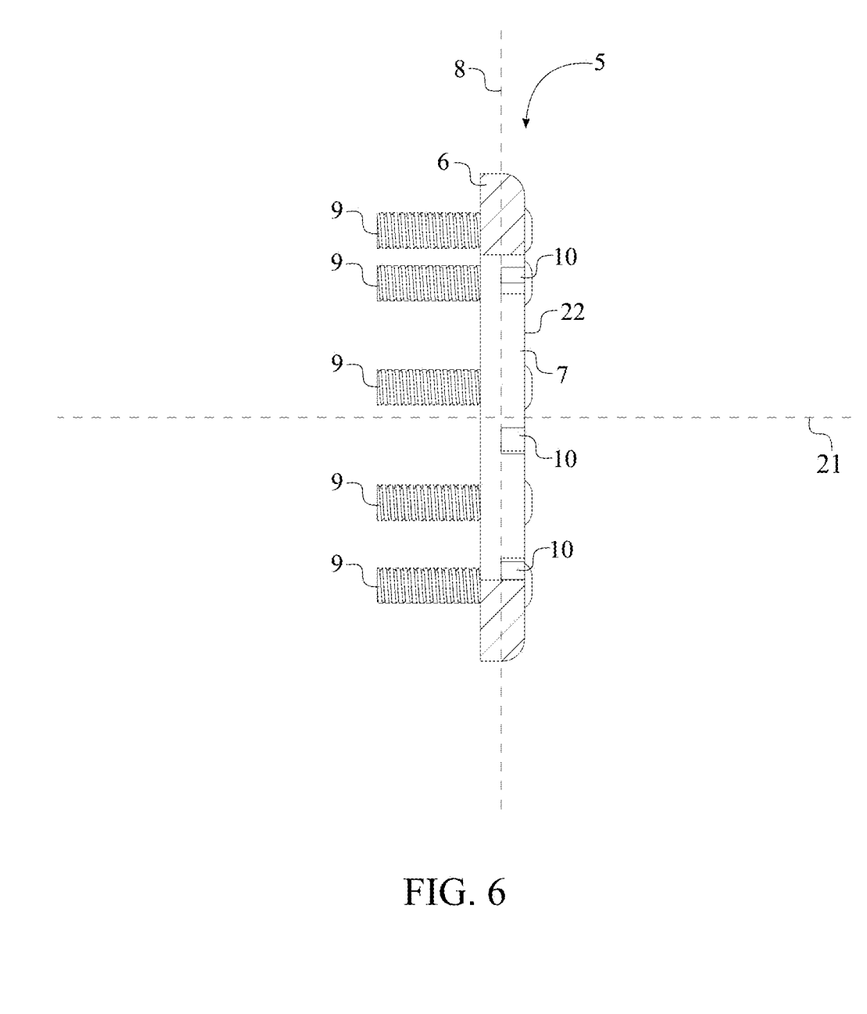
FIG. 6 is a cross sectional view of the bolt ring of the present invention.

In reference to FIG. 5-6, the bolt ring 5 comprises a ring body 6 and a plurality of wheel studs 9. The ring body 6 is an annular body that is sufficient to receive and secure the plurality of wheel studs 9. The inner diameter of the ring body 6 is slightly larger than the outer diameter of the inboard end 2 so that the ring body 6 can be concentrically positioned around the inboard end 2. The plurality of wheel studs 9 is radially positioned around the ring body 6 so that the bolt pattern of the plurality of wheel studs 9 can be defined. Furthermore, the plurality of wheel studs 9 traverses through the ring body 6 and oriented towards the outboard end 3 so that a wheel can be mounted to the bolt ring 5 via lug nuts. More specifically, a plurality of bolt securing openings is positioned around the ring body 6 so that the plurality of wheel studs 9 can be inserted and pressed into the plurality of bolt securing openings. The plurality of locking splines 10 is radially connected onto an inner edge 7 of the ring body 6 and inwardly extended toward the central axis 21. Furthermore, the plurality of locking splines 10 is extended from a sagittal plane 8 of the ring body 6 to an inboard edge 22 of the ring body 6 thus completely exposing the inner edge 7 from the sagittal plane 8 to an outboard edge of the ring body 6.

Figure 7:
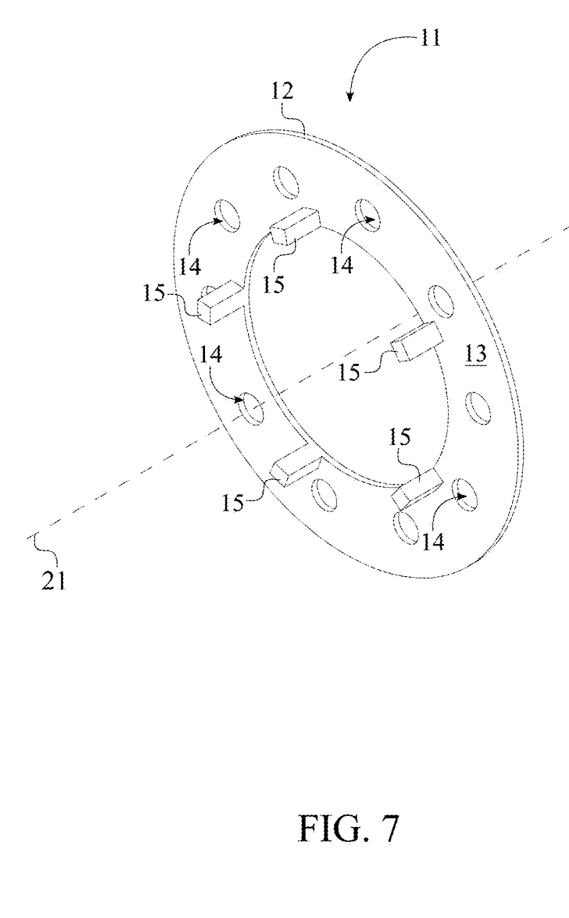
FIG. 7 is a perspective view of the locking collar of the present invention.

In reference to FIG. 7, the locking collar 11 comprises a collar body 12 and a plurality of bolt-receiving openings 14. The collar body 12 is an annular body similar to the ring body 6. The inner diameter of the collar body 12 is slightly larger than the outer diameter of the inboard end 2 so that the collar body 12 can be concentrically positioned around the inboard end 2. The plurality of bolt-receiving openings 14 is radially positioned around the ring body 6 so that the bolt pattern of the plurality of wheel studs 9 can be inserted through the plurality of bolt-receiving openings 14. For example, when a preferred embodiment of the bolt ring 5 comprises ten wheel studs 9, the locking collar 11 also comprises ten bolt-receiving openings 14 so that the corresponding bolt ring 5 and the locking collar 11 can be assembled together. Furthermore, the plurality of locking tabs 15 is radially connected onto an inboard surface 13 of the collar body 12 and outwardly extended from the central axis 21.

Figure 8:
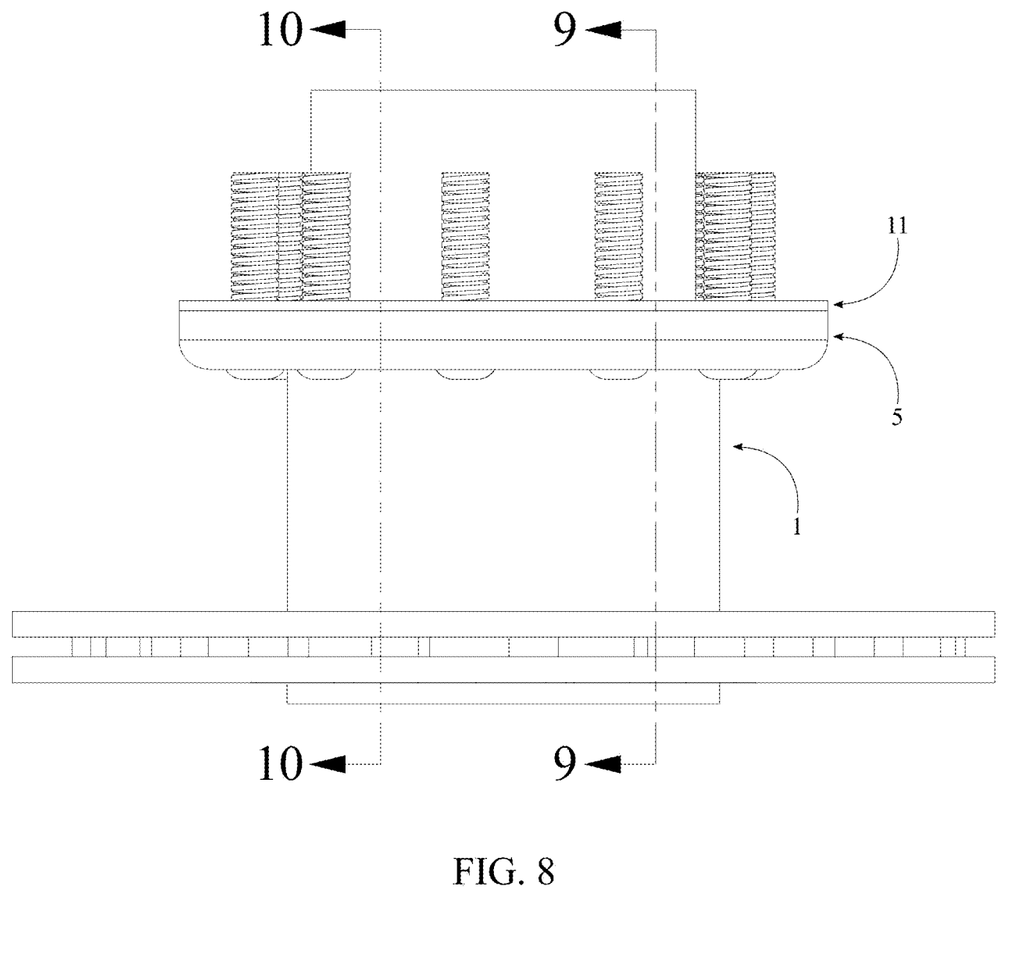
FIG. 8 is a side view of the present invention, showing planes upon which a cross-sectional view is taken shown in FIG. 9 and FIG. 10.
Figure 9:
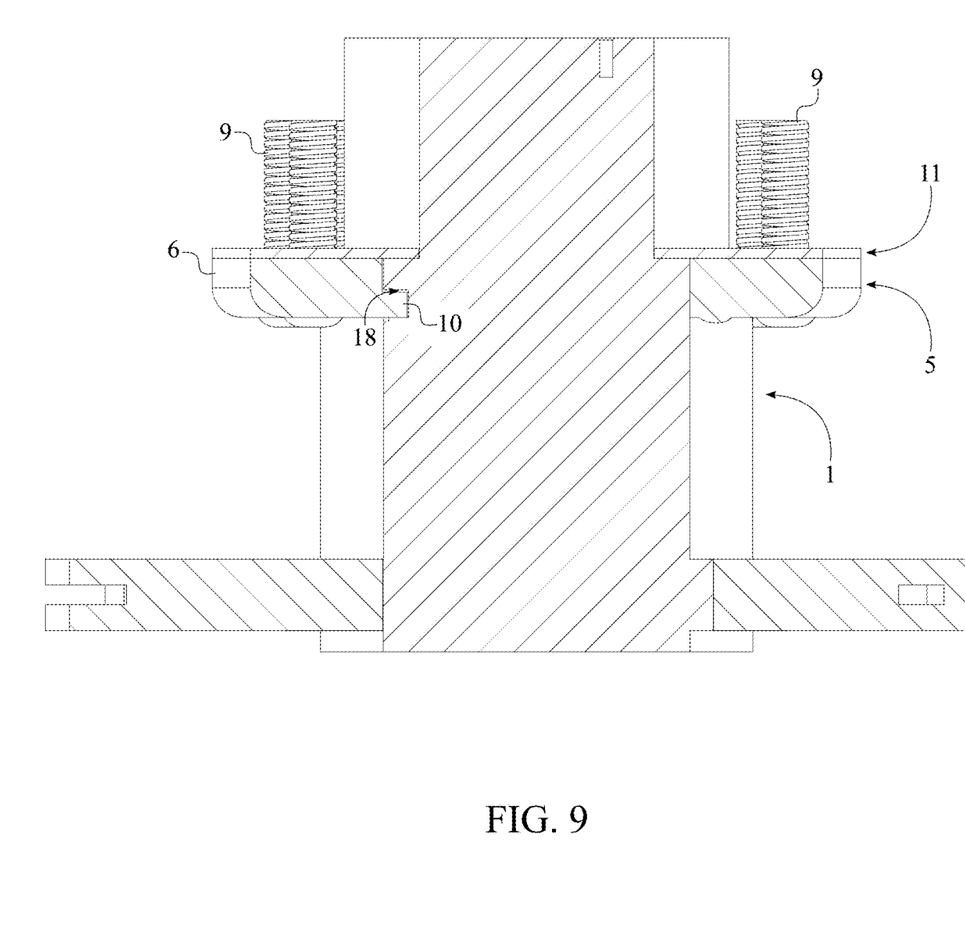
FIG. 9 is a cross-sectional view of the present invention, showing the connection between the hub cylinder and the bolt ring.
Figure 10:
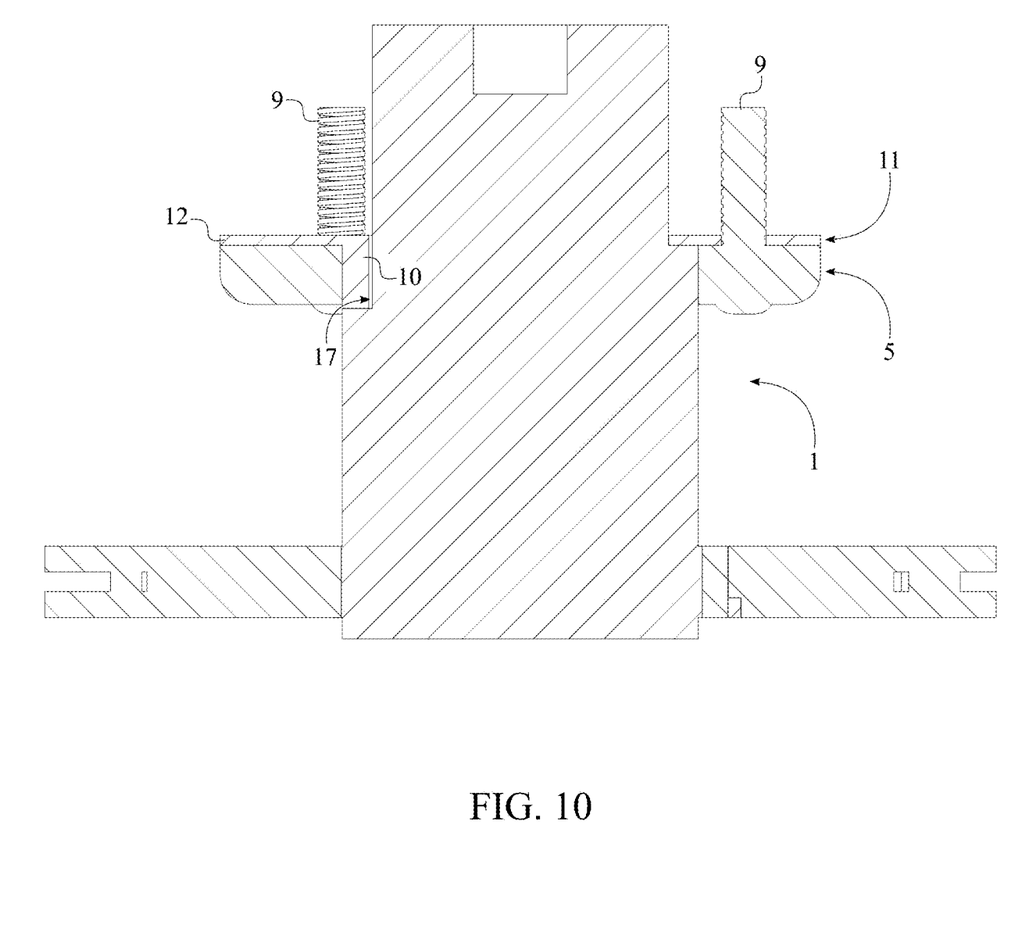
FIG. 10 is a cross-sectional view of the present invention, showing the connection between the hub cylinder and the locking collar.

In reference to FIG. 8-10, the ring body 6 is adjacently positioned to the collar body 12 as the collar body 12 is positioned adjacent the outboard end 3. In order to allow the plurality of wheel studs 9 to expose about the outboard end 3, each of the plurality of bolt-receiving openings 14 is concentrically positioned with a corresponding stud from the plurality of wheel studs 9. In reference to the connection between the hub cylinder 1 and the bolt ring 5, each of the plurality of locking splines 10 is removably engaged within a corresponding locking cavity 18 from the plurality of L-shaped locking recesses 16. More specifically, each of the plurality of locking splines 10 is first inserted into a corresponding alignment cavity 17 through a corresponding access opening 19. Then, the bolt ring 5 is rotated about the central axis 21 thus engaging each of the plurality of locking splines 10 within the corresponding locking cavity 18. In reference to the connection between the hub cylinder 1 and the locking collar 11, each of the plurality of locking tabs 15 is removably engaged within a corresponding alignment cavity 17 from the plurality of L-shaped locking recesses 16. More specifically, each of the plurality of locking tabs 15 is inserted into the corresponding alignment cavity 17 through a corresponding access opening 19. Then, the locking collar 11 is able to secure the bolt ring 5 within the plurality of L-shaped locking recesses 16.

The plurality of rotor mounts 20 provides a platform to secure the disk rotor to the present invention. In reference to FIG. 2, the plurality of rotor mounts 20 is radially integrated around the hub cylinder 1 so that the disk rotor can slide from the outboard end 3 and onto the plurality of rotor mounts 20. Then, the disk rotor can be attached to the hub cylinder 1 by utilizing disk rotor bolts. A preferred embodiment for each of the plurality of rotor mounts 20 is an L-shaped bracket that is radially extended away from the central axis 21 so that the disk rotor can be aligned and mounted. Furthermore, each of the plurality of rotor mounts 20 comprises a long leg and a short leg thus defining the L-shaped bracket. The long leg is radially connected to the hub cylinder 1 and the short leg is terminally connected to the long leg and outwardly extended from the long leg. As a result, the disk rotor can be engaged and mounted with each of the plurality of rotor mounts 20 thus securing the disk rotor to the hub cylinder 1. Depending upon different embodiments of the disk rotor, the plurality of rotor mounts 20 may requires optional spacers, adaptors, sleeves or any other types of structural components that complete a precise alignment between the disk rotor and the plurality of rotor mounts 20.

An alternative embodiment of the present invention, the plurality of rotor mounts 20 is intergraded around an adaptor body. More specifically, the adaptor body is concentrically positioned around the hub cylinder 1 and functions as the attachment body between the disk rotor and the hub cylinder 1 thus enabling the adaptor body to be removed or inserted through the outboard end 3. The alternative embodiment further comprises a plurality of first adaptor mounts and a plurality of second adaptor mounts that enable the connection of the adaptor body to the hub cylinder 1. More specifically, the plurality of first adaptor mounts is radially intergraded around the adaptor body and oppositely positioned from the plurality of rotor mounts 20 about the adaptor body. The plurality of second adaptor mounts radially traverses through the ring body 6. Each of the plurality of first adaptor mounts is concentrically mounted to a corresponding mount from the plurality of second adaptor mounts with a disk rotor bolt so that the adaptor body can be mounted to the hub cylinder 1 through the ring body 6.

In an exemplary method of installing a disk rotor, the preferred embodiment of the present invention includes the following basic steps that significantly reduce the overall maintenance costs and downtime for fleets.

1. Slide and remove locking collar 11 through the outboard end 3
2. Slide and remove the bolt ring 5 through the outboard end 3
3. Remove the disk rotor bolts
4. Slide and remove the existing disk rotor through the outboard end 3
5. Install the new disk rotor to the plurality of rotor mounts 20 through the outboard end 3
6. Reinstall the disk rotor bolts through the outboard end 3
7. Reinstall the bolt ring 5 through the outboard end 3
8. Reinstall the locking collar 11 through the outboard end 3

This simpler method can eliminate the cost for bearings, seals, oil, and gaskets needed in the existing hub design and considerably reduces the labor cost. Additionally, the total weight that is lifted by the brake technician during the process of brake installation is lowered thus reducing costly workplace injuries.

Although the invention has been explained in relation to its preferred embodiment, it is to be understood that many other possible modifications and variations can be made without departing from the spirit and scope of the invention as hereinafter claimed.

What is claimed is:

1. A wheel hub and removable bolt ring assembly for air disk braking system comprising:
    a hub cylinder;
    a bolt ring;
    a locking collar;
    a plurality of L-shaped locking recesses;
    a plurality of rotor mounts;
    the hub cylinder, the bolt ring, the locking collar, the plurality of L-shaped locking recesses, and the plurality of rotor mounts being concentrically positioned around a central axis;
    the plurality of rotor mounts being positioned adjacent to an inboard end of the hub cylinder;
    the plurality of L-shaped locking recesses radially traversing into the inboard end;
    the bolt ring and the locking collar being positioned around the inboard end;
    the bolt ring and the locking collar being positioned offset from the plurality of rotor mounts;
    a plurality of locking splines of the bolt ring being removably mounted around the hub cylinder through the plurality of L-shaped locking recesses; and
    a plurality of locking tabs of the locking collar being removably mounted around the hub cylinder through the plurality of L-shaped locking recesses.

2. The wheel hub and removable bolt ring assembly for air disk braking system as claimed in claim 1 comprising:
    a plurality of axle attachments;
    the plurality of axle attachments being positioned adjacent to an outboard end of the hub cylinder;
    the plurality of axle attachments being radially positioned around the central axis; and each of the plurality of axle attachments traversing into the hub cylinder.

3. The wheel hub and removable bolt ring assembly for air disk braking system as claimed in claim 1 comprising:
the bolt ring comprising a ring body and a plurality of wheel studs;
the plurality of wheel studs being radially positioned around the ring body;
the plurality of wheel studs traversing through the ring body;
the plurality of wheel studs being oriented towards an outboard end of the hub cylinder;
the plurality of locking splines being radially connected onto an inner edge of the ring body;
the plurality of locking splines being extended from a sagittal plane of the ring body to an inboard edge of the ring body; and
the plurality of locking splines being inwardly extended toward the central axis.

4. The wheel hub and removable bolt ring assembly for air disk braking system as claimed in claim 1 comprising:
the locking collar comprising a collar body and a plurality of bolt-receiving openings;
the plurality of bolt-receiving openings being radially positioned around the collar body;
the plurality of locking tabs being radially connected onto an inboard surface of the collar body; and
the plurality of locking tabs being outwardly extended from the central axis.

5. The wheel hub and removable bolt ring assembly for air disk braking system as claimed in claim 1 comprising:
each of the plurality of L-shaped locking recesses comprising an alignment cavity, a locking cavity, and an access opening;
the alignment cavity and the locking cavity being perpendicularly positioned of each other;
the locking cavity being terminally positioned to the alignment cavity;
the access opening being terminally positioned to the alignment cavity; and
the locking cavity and the access opening being oppositely positioned of each other about the alignment cavity.

6. The wheel hub and removable bolt ring assembly for air disk braking system as claimed in claim 5 comprising:
the bolt ring comprising a ring body and a plurality of wheel studs;
the locking collar comprising a collar body and a plurality of bolt-receiving openings;
the ring body being adjacently positioned to the collar body; and
each of the plurality of bolt-receiving openings being concentrically positioned with a corresponding stud from the plurality of wheel studs.

7. The wheel hub and removable bolt ring assembly for air disk braking system as claimed in claim 5 comprising:
each of the plurality of locking splines of the bolt ring being removably engaged within a corresponding locking cavity from the plurality of L-shaped locking recesses; and
each of the plurality of locking tabs of the locking collar being removably engaged within a corresponding alignment cavity from the plurality of L-shaped locking recesses.

8. The wheel hub and removable bolt ring assembly for air disk braking system as claimed in claim 1, wherein the plurality of rotor mounts is radially integrated around the hub cylinder.

* * * * *